United States Patent
Saratovsky et al.

(10) Patent No.: US 9,227,172 B2
(45) Date of Patent: Jan. 5, 2016

(54) SILICA CONTAINING BASIC SORBENT FOR ACID GAS REMOVAL

(71) Applicant: Ecolab USA Inc., Naperville, IL (US)

(72) Inventors: Ian Saratovsky, Highland Park, IL (US); Tommy Hung-Ting Chen, Naperville, IL (US); Nicholas S. Ergang, Naperville, IL (US); Lewis B. Benson, Sewickely, PA (US)

(73) Assignee: Ecolab USA Inc., Naperville, IL (US)

( * ) Notice: Subject to any disclaimer, the term of this patent is extended or adjusted under 35 U.S.C. 154(b) by 443 days.

(21) Appl. No.: 13/646,514

(22) Filed: Oct. 5, 2012

(65) Prior Publication Data

US 2013/0089484 A1  Apr. 11, 2013

Related U.S. Application Data

(60) Provisional application No. 61/544,758, filed on Oct. 7, 2011.

(51) Int. Cl.

| | |
|---|---|
| *B01D 53/02* | (2006.01) |
| *B01J 20/10* | (2006.01) |
| *B01J 20/22* | (2006.01) |
| *B01D 53/50* | (2006.01) |
| *B01D 53/68* | (2006.01) |
| *B01J 20/04* | (2006.01) |
| *B01J 20/06* | (2006.01) |
| *B01J 20/18* | (2006.01) |
| *B01J 20/20* | (2006.01) |
| *B01J 20/30* | (2006.01) |
| *B01J 20/02* | (2006.01) |

(52) U.S. Cl.
CPC .............. *B01J 20/103* (2013.01); *B01D 53/02* (2013.01); *B01D 53/508* (2013.01); *B01D 53/685* (2013.01); *B01J 20/0277* (2013.01); *B01J 20/041* (2013.01); *B01J 20/043* (2013.01); *B01J 20/06* (2013.01); *B01J 20/10* (2013.01); *B01J 20/18* (2013.01); *B01J 20/20* (2013.01); *B01J 20/22* (2013.01); *B01J 20/3085* (2013.01); *B01D 2251/302* (2013.01); *B01D 2251/304* (2013.01); *B01D 2251/306* (2013.01); *B01D 2251/402* (2013.01); *B01D 2251/404* (2013.01); *B01D 2251/406* (2013.01); *B01D 2251/408* (2013.01); *B01D 2251/60* (2013.01); *B01D 2251/80* (2013.01); *B01D 2253/304* (2013.01); *B01D 2253/306* (2013.01); *B01D 2253/311* (2013.01); *B01D 2257/2045* (2013.01); *B01D 2258/0283* (2013.01); *B01D 2258/0291* (2013.01); *B01J 2220/42* (2013.01); *B01J 2220/46* (2013.01)

(58) Field of Classification Search
CPC ................... B01D 2251/302; B01D 2251/304; B01D 2251/306; B01D 2251/402; B01D 2251/404; B01D 2251/406; B01D 2251/408; B01D 2251/60; B01D 2251/80; B01D 2253/304; B01D 2253/306; B01D 2253/311; B01D 2257/2045; B01D 2258/0283; B01D 2258/0291; B01D 53/02; B01D 53/508; B01D 53/685; B01J 20/0277; B01J 20/041; B01J 20/043; B01J 20/06; B01J 20/10; B01J 20/103; B01J 20/18; B01J 20/20; B01J 20/22; B01J 20/3085; B01J 2220/42; B01J 2220/46

See application file for complete search history.

(56) References Cited

U.S. PATENT DOCUMENTS

| | | | | |
|---|---|---|---|---|
| 3,532,637 | A * | 10/1970 | Zeff et al. .................. | 252/190 |
| 6,521,021 | B1 | 2/2003 | Pennline et al. | |
| 7,572,421 | B2 | 8/2009 | Yang et al. | |
| 8,025,726 | B1 | 9/2011 | Kesier et al. | |
| 2005/0170109 | A1 * | 8/2005 | Chen et al. .................. | 428/32.36 |
| 2008/0034968 | A1 * | 2/2008 | Nordberg et al. .................. | 95/90 |
| 2009/0047200 | A1 * | 2/2009 | Holmes et al. .............. | 423/242.1 |
| 2011/0123422 | A1 * | 5/2011 | Wang .......................... | 423/240 S |
| 2011/0250110 | A1 * | 10/2011 | Keiser et al. .................. | 423/210 |
| 2012/0263634 | A1 * | 10/2012 | Ergang et al. .............. | 423/215.5 |

OTHER PUBLICATIONS

Nalco 1034A Colloidal Silica Dioxide, Nalco Product Bulletin K-1034A; Nalco Company 1601 West Diehl Road, Naperville, Illinois 60563-1198, © copyright 1997, 2005 Nalco Company.

* cited by examiner

*Primary Examiner* — Christopher P Jones
(74) *Attorney, Agent, or Firm* — Leydig, Voit & Mayer, Ltd.

(57) ABSTRACT

An acid gas sorbent composition is disclosed. The composition comprises a compound having the following formula: $(SiO_2)_x(OH)_y$.F.B wherein F optionally exists and said F is at least one of the following: a functionalized organosilane, a sulfur-containing organosilane, or an amine-containing organosilane; and wherein B is a hygroscopic solid at a preferred water to solid molar ratio of about 0.1 to about 6, and more particularly, B is a basic inorganic solid including, but not limiting to, alkali or alkali-earth metal oxides, hydroxides, carbonates, or bicarbonates, containing at least one of the following metal cations: calcium, magnesium, strontium, barium, sodium, lithium, potassium, cesium, lanthanum, cerium, praseodymium, neodymium, samarium, europium, gadolinium, dysprosium, scandium, ytterbium, yttrium, or erbium; wherein the molar ratio of y/x is equal to about 0.01 to about 0.5.

28 Claims, 2 Drawing Sheets

SILICA CONTAINING BASIC SORBENT FOR ACID GAS REMOVAL

CROSS-REFERENCE TO RELATED APPLICATION

This claims priority to U.S. provisional patent application No. 61/544,758, filed on Oct. 7, 2011, the content of which is hereby fully incorporated by reference.

TECHNICAL FIELD

The present disclosure relates generally to sorbent compositions for acid gas emission control, and more particularly to compositions of free-flowing sorbent containing silica and a basic inorganic solid for acid gas emission control. The present disclosure also relates to a process of treating a gas stream, for example, a gas stream containing at least hydrogen chloride, sulfur dioxide, and/or sulfur trioxide.

BACKGROUND

Current emission control strategies for acidic gas species (e.g., HCl, $SO_2$, and $SO_3$) rely on solid sorbents for removal of pollutants from exhaust gas streams. The reduction of HCl, $SO_2$, and $SO_3$ are achieved by injection of basic sorbents into a dry scrubber or upstream of particulate control devices (e.g., electrostatic precipitator, fabric filter, or Venturi separator). In particular, basic materials are injected into the flue gas stream to contact the gas and neutralize acid gases, including hydrogen halides, $SO_2$, $SO_3$, and other acid gas species. Typical sorbents include hydrated lime (i.e., $Ca(OH)_2$), sodium carbonate (i.e., $Na_2CO_3$), sodium bicarbonate (i.e., $NaHCO_3$), and trona (i.e., $Na_2CO_3 \cdot NaHCO_3 \cdot xH_2O$). Although sodium-containing sorbents can be effective, they are often prohibitively expensive owing to localized availability and their propensity to foul power plant equipment. Additionally, sodium-containing sorbents are often soluble in water, and can potentially leach into the surrounding environment after the ash is landfilled. On the other hand, hydrated lime is relatively inexpensive; however the reactions between acid gases and hydrated lime are often less efficient than with their sodium-containing counterparts. Accordingly, there exists a need for improved sorbents for control of acidic gas species emissions from gas streams.

SUMMARY

In one aspect, disclosed is a sorbent composition comprising a compound having formula (I), $$(SiO_2)_x(OH)_y \cdot F \cdot B \qquad (I)$$

wherein

F optionally exists and said F is at least one of the following: a functionalized organosilane, a sulfur-containing organosilane, or an amine-containing organosilane;

B is a hygroscopic solid at a preferred water to solid molar ratio of about 0.1 to about 6, and more particularly, B is a basic inorganic solid selected from alkali or alkali-earth metal oxides, hydroxides, carbonates, and bicarbonates, said basic inorganic solid containing a metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium; and the molar ratio of y/x is equal to about 0.01 to about 0.5.

The sorbent composition may comprise a compound having a formula of: $(SiO_2)(OH)_y \cdot 16.1Ca(OH)_2$ where y is the surface concentration of hydroxyl species as determined by the moisture content.

The sorbent composition may comprise a compound having a formula of: $(SiO_2)(OH)_y \cdot 19.8Ca(OH)_2$ where y is the surface concentration of hydroxyl species as determined by the moisture content.

The sorbent composition may comprise a compound having a formula of: $(SiO_2)(OH)_y \cdot 21.8Ca(OH)_2$ where y is the surface concentration of hydroxyl species as determined by the moisture content.

The sorbent composition may comprise a compound having a formula of: $(SiO_2)(OH)_y \cdot 24.9Ca(OH)_2$, where y is the surface concentration of hydroxyl species as determined by the moisture content.

The sorbent composition may comprise a compound having a formula of: $(SiO_2)(OH)_y \cdot 55.6Ca(OH)_2$, where y is the surface concentration of hydroxyl species as determined by the moisture content.

In another aspect, disclosed is a product produced by the addition of an aqueous-based silicate-containing precursor (SCP) to an inorganic solid including, but not limiting to, alkali and alkali-earth metal oxides, hydroxides, carbonates, and bicarbonates such that the aqueous portion is adsorbed by the basic solid to form a hydrated product in a free-flowing powder form. The aqueous SCP solution contains either (a) a pH value less than or equal to a pH of about 7, (b) a pH value greater than 7, (c) multiple soluble inorganic salts, (d) solid content range from 0.1~80 wt %, (e) optionally functional groups wherein the resultant functionalized dried product is at least one of the following: a functionalized organosilane, a sulfur-containing organosilane, or an amine-containing organosilane, or (f) combinations thereof. The product may be a compound having formula (I).

In another aspect, disclosed is a sorbent composition comprising a compound having formula (II), $$(SiO_2)_x(OH)_y \cdot B \qquad (II)$$

wherein

B is a basic metal oxide, hydroxide, or carbonate, said B containing a metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium; and the molar ratio of y/x is equal to 0.01 to 0.5.

DETAILED DESCRIPTION

Figure 1:
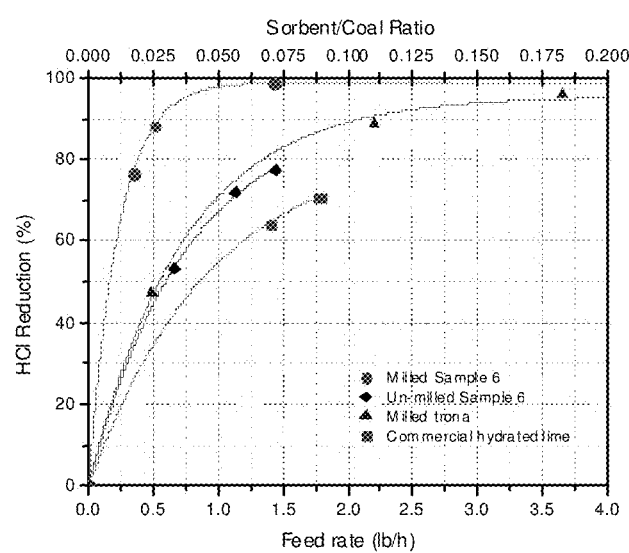
FIG. 1 depicts the HCl reduction in the flue gas stream by various sorbents tested in a combustion test facility at Western Research Institute.

Disclosed herein are dry, flowable sorbents useful for controlling acidic gas species emissions from gas streams. The sorbents include a water-retention additive (e.g., a silicate) to maintain a locally moist environment near the sorbent particle surfaces, and a basic inorganic component (e.g., $Ca(OH)_2$) to neutralize acid gas species. It is believed that incorporation of moisture at the sorbent particle surfaces aids in solubilization and reaction of acid gas species with the sorbent basic inorganic surfaces. The sorbents eliminate the need for humidifying an entire flue gas stream, and avoid the problems associated with in-duct humidification and slurry injection associated with other sorbent types. Furthermore, the sorbents have unexpectedly high surface areas and pore volumes relative to lime hydrated at the same rate, thereby providing greater efficiency of acid species absorption. The sorbents exhibit improved HCl capture relative to trona and hydrated lime.

As moisture retaining free-flowing powders, the sorbent compositions provide economic, processing, and performance advantages over conventional sorbents. Typical acid gas sorbents (e.g., hydrated lime, trona, sodium bicarbonate, etc.) demonstrate sorbent feed problems at elevated moisture levels. The addition of a water-retention additive (e.g., a silicate) allows for a higher moisture content than conventional sorbents, leading to improved performance, yet still maintaining a dry, flowable form that allows for facile processing and use.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "and" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

2. SORBENT COMPOSITIONS

The sorbent compositions disclosed herein include at least one active sorbent compound useful for capture of acid gas species from a gas stream. In certain embodiments, the sorbent compositions consist of or consist essentially of one or more active sorbent compounds, as described herein. In other embodiments, the sorbent compositions may optionally include one or more additional components beyond the at least one active sorbent compound. The sorbent compositions may include various combinations of sorbent compounds and associated compositions. The active sorbent compound(s) can be in various forms and proportions relative to the one or more additional components of the compositions. In certain embodiments, the sorbent compositions can stand alone, be further modified by chemical and/or physical means, or integrated into other products (e.g., consumer or industrial products).

The sorbent compositions may comprise the active sorbent compound(s) in any suitable amount for the intended application. In certain embodiments, the sorbent composition may comprise about 40% to about 99% by weight active sorbent compound, about 60% to about 99% by weight active sorbent compound, or about 80% to 99% by weight active sorbent compound.

In certain embodiments, the sorbent compositions may comprise excess moisture of greater than 3 weight %. In certain embodiments, the sorbent compositions may have a moisture content of 1 weight %, 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight %, 21 weight %, 22 weight %, 23 weight %, 24 weight %, 25 weight %, 26 weight %, 27 weight %, 28 weight %, 29 weight %, 30 weight %, 31 weight %, 32 weight %, 33 weight %, 34 weight %, 35 weight %, 36 weight %, 37 weight %, 38 weight %, 39 weight %, or 40 weight %. In certain embodiments, the sorbent compositions may have a moisture content ranging from 1 weight % to 40 weight %, from 3 weight % to 40 weight %, from 3 weight % to 30 weight %, or from 3 weight % to 20 weight %.

In certain embodiments, the sorbent compositions may be a powder, preferably a free-flowing powder. The sorbent compositions may comprise about 40% to about 99% by weight active compound and about 60% to 1% moisture; about 60% to about 99% by weight active compound and about 40% to about 1% moisture; or about 80% to 99% by weight active compound and about 20% to 1% moisture. The sorbent composition may be characterized by a particle size of about 2 μm to about 500 μm, about 2 μm to about 200 μm, about 2 μm to about 40 μm, about 2 μm to about 20 μm, or about 5 μm to about 20 μm. The sorbent composition may be characterized by a surface area of about 2 $m^2/g$ to about 800 $m^2/g$, or about 2 $m^2/g$ to about 200 $m^2/g$. The sorbent composition may be characterized by a pore volume of 0.01 cc/g to 2.0 cc/g, preferably about 0.01 cc/g to about 1.0 cc/g.

a. Active Sorbent Compound

The active sorbent compound may be a compound having a hydroscopic silicate component and a basic solid component. The silicate component may maintain a locally moist environment near the sorbent particle surface to aid in solubilization and reaction of acid gas species with the sorbent particle basic solid component surfaces.

In certain embodiments, the active sorbent compound may have formula (I):

$$(SiO_2)_x(OH)_y.F.B \qquad (I)$$

wherein

F optionally exists and said F is at least one of the following: a functionalized organosilane, a sulfur-containing organosilane, or an amine-containing organosilane;

B is a hygroscopic solid at a preferred water to solid molar ratio of about 0.1 to about 6, and more particularly, B is a basic inorganic solid selected from alkali or alkali-earth metal oxides, hydroxides, carbonates, and bicarbonates, said basic inorganic solid containing a metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium; and the molar ratio of y/x is equal to about 0.01 to about 0.5.

In certain embodiments, the active sorbent compound may have formula (II):

$$(SiO_2)_x(OH)_y.B \qquad (II)$$

wherein

B is a hygroscopic solid at a preferred water to solid molar ratio of about 0.1 to about 6, and more particularly, B is a basic metal oxide, hydroxide, or carbonate, said B containing a metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium; and the molar ratio of y/x is equal to 0.01 to 0.5.

In certain embodiments, the active sorbent compound has formula $(SiO_2)(OH)_y \cdot 16.1Ca(OH)_2$ wherein y is the concentration of hydroxyl species on the silicate surface as determined by moisture content.

In certain embodiments, the active sorbent compound has formula $(SiO_2)(OH)_y \cdot 19.8Ca(OH)_2$ wherein y is the concentration of hydroxyl species on the silicate surface as determined by moisture content.

In certain embodiments, the active sorbent compound has formula $(SiO_2)(OH)_y \cdot 21.8Ca(OH)_2$ wherein y is the concentration of hydroxyl species on the silicate surface as determined by moisture content.

In certain embodiments, the active sorbent compound has formula $(SiO_2)(OH)_y \cdot 24.9Ca(OH)_2$ wherein y is the concentration of hydroxyl species on the silicate surface as determined by moisture content.

In certain embodiments, the active sorbent compound has formula $(SiO_2)(OH)_y \cdot 55.6Ca(OH)_2$ wherein y is the concentration of hydroxyl species on the silicate surface as determined by moisture content.

b. Other Components

The sorbent compositions may include other components. In certain embodiments, the sorbent composition may be provided as a powder blended with mercury sorbents such as activated carbon, halogenated activated carbon, and/or inorganic mercury sorbents. In certain embodiments, the sorbent composition may include a silica containing composition as described in U.S. Pat. No. 8,025,726, which is herein incorporated by reference. In certain embodiments, the sorbent composition may include 1 to 50% by weight other inorganic sorbents, such as aluminosilicates, silica-containing materials, clays, or zeolites (e.g., synthetic zeolites). In certain embodiments, the sorbent compositions may include 1 to 50% by weight activated carbon. The activated carbon may be produced by the Thief Carbon process as described in U.S. Pat. No. 6,521,021, which is herein incorporated by reference. In certain embodiments, the activated carbon may be prepared from carbon based starting materials, such as coal, lignite, wood, wood byproducts, or bark. In certain embodiments, the activated carbon may be replaced with or mixed with halogenated activated carbon, such as chlorinated activated carbon or brominated activated carbon. In certain embodiments, the sorbent compositions may include 1% to 50% by weight of a silica based mercury sorbent or aluminosilicate based mercury sorbent, such as that described in U.S. Pat. No. 7,572,421, which is herein incorporated by reference.

In certain embodiments, the sorbent compositions may be blended with alkaline sulfur oxide sorbents. Alkaline sulfur oxide sorbents include, but are not limited to, trona, calcium hydroxide, lime, hydrated lime, and calcium oxide containing compounds or materials. In certain embodiments, the alkaline sulfur oxide sorbent may be applied upstream of the sorbent in a scrubber process. In certain embodiments, the sulfur oxide alkaline-containing sorbent may be added separately from the sorbent by such methods as FSI (Furnace Sorbent Injection).

In certain embodiments, the sorbent composition further contains one or more halogens.

3. METHOD OF MANUFACTURE

The sorbent compositions and compounds may be produced by the addition of an aqueous-based silicate-containing precursor (SCP) to a basic inorganic solid. Optionally, an organosilane species may be used to further functionalize the sorbent active compound. The aqueous SCP solution may contain either (a) a pH value less than or equal to a pH of about 7, (b) a pH value greater than 7, (c) multiple soluble inorganic salts, (d) solid content range from 0.1~80 wt %, (e) optionally functional groups wherein the resultant functionalized dried product is at least one of the following: a functionalized organosilane, a sulfur-containing organosilane, or an amine-containing organosilane, or (f) combinations thereof.

In certain embodiments, the aqueous-based SCP is added to a hygroscopic inorganic solid in a fluidized bed mixer such that the water is adsorbed uniformly by the solid to form a hydrated powder containing the SCP. In certain embodiments, the active sorbent compositions may be prepared by spraying silicic acid or a solution of colloidal silica onto a fluidized bed of calcium oxide (i.e., lime) to form a sorbent composition comprising a compound having the following formula $(SiO_2)_x(OH)_y \cdot B$ as described above, wherein the sorbent composition comprises 80% to 99% by weight of the active compound and is as free-flowing powder. In certain embodiments, the sorbent compositions may be prepared by spraying a solution of alkaline silicate onto a fluidized bed of lime (i.e., CaO) to form a sorbent composition comprising a compound having the formula $(SiO_2)_x(OH)_y \cdot Ca(OH)_2$ as described above, wherein the sorbent composition comprises 80% to 99% by weight of active compound and is a free-flowing powder.

i. Silica Containing Precursors

The silica containing precursor (SCP) may be silicic acid, colloidal silica, tetraethylorthosilicate, dispersed fumed silica, alkaline silicates (e.g., sodium or potassium silicate), or a combination thereof. In one preferred embodiment, the silica containing precursor is silicic acid. In another preferred embodiment, the silica containing precursor is Nalco 8691 silica sol, which can be obtained from Nalco Company, 1601 West Diehl Road, Naperville, Ill. 60563. In another preferred embodiment, the silica containing precursor is Nalco 1034A, a deionized colloidal silica sol with a particle size of 20 nm, which can be obtained from Nalco Company.

The aqueous-based silicate-containing precursor may be prepared by dispersing one or more silica containing precursors in deionized water. The aqueous-based silicate-containing precursor solution may comprise from 1 weight % to 50 weight % SCP, from 2 weight % to 20 weight % SCP, or from 3 weight % to 8 weight % SCP.

ii. Basic Inorganic Solid

Suitable basic inorganic solids include, but are not limited to, alkali and alkali-earth metal oxides, hydroxides, carbonates, and bicarbonates, such that the aqueous portion is adsorbed by the basic solid to form a hydrated product in a free-flowing powder form. The basic inorganic solid may be calcium oxide (lime), calcium hydroxide (hydrated lime), dolomitic lime, calcium carbonate, magnesium oxide, magnesium hydroxide, magnesium carbonate, sodium carbonate, sodium bicarbonate, trona, sodium oxide, sodium hydroxide, potassium oxide, potassium hydroxide, potassium carbonate, or a combination thereof.

iii. Organosilanes

Organosilanes that can be used are well known in the art and may be represented generally by $R_{(4-a)}$—$SiX_a$, wherein a may be from 1 to 3. The organo-functional group, R—, may be any aliphatic or alkene containing functionalized group such as propyl, butyl, 3-chloropropyl, amine, thiol, and combinations thereof. X is representative of a hydrolysable alkoxy group, typically methoxy or ethoxy. Some examples are 3-thiopropyl and mercaptopropyl silanes.

Thiols and amines are represented generally by the class of organic and inorganic compounds containing the amine or thiol group having the general formula —B—(SH) or —B—(NH$_2$), wherein B is a linear or branched group consisting of carbon atoms such as —(CH$_2$)$_n$—, wherein n is from 1 to 15, 1 to 6, or where n is 3.

iv. Synthetic Method I—Acidic Starting Point

One synthetic methodology for preparing the sorbent compositions and/or the actives component involves starting from an acidic starting point. In certain embodiments, the sorbent compositions may be prepared by a process including: a) providing a silica containing precursor (SCP) (e.g., silicic acid, colloidal silica, tetraethylorthosilicate, or dispersed fumed silica) contained in aqueous solution that has a pH less than or equal to a pH of 7, preferably from 3 to 4; and b) adding the acidic SCP to a fluidized bed of a hygroscopic basic metal oxide, carbonate, or hydroxide.

In certain embodiments, the method comprises adjusting the pH of the SCP to greater than 7 by combining said SCP with an alkaline metal oxide, hydroxide, or carbonate to form the silica based product.

Any suitable reactor or mixing device may be utilized in the method of the invention. In certain embodiments, a plow-type mixer/reactor may be utilized to fluidize a powdered basic metal oxide, hydroxide, or carbonate.

v. Synthetic Method II—Alkaline Starting Point

Another synthetic methodology involves starting from an alkaline starting point. In certain embodiments, the sorbent compositions may be prepared by a process including: a) providing a silica containing precursor (SCP) (e.g., alkaline silicates) contained in solution that has a pH greater than 7; and b) adding the alkaline SCP to a fluidized bed of a hygroscopic basic metal oxide, carbonate, or hydroxide.

In another embodiment, the method further comprises maintaining the pH of the SCP at greater than 7 by combining said SCP with an alkaline metal oxide, hydroxide, or carbonate to form the silica based product.

Any suitable reactor or mixing device may be utilized in the method of the invention. In certain embodiments, a plow-type mixer/reactor may be utilized to fluidize a powdered basic metal oxide, hydroxide, or carbonate.

4. METHOD OF USE

The sorbent compositions disclosed herein may be used in any process in which it is desirable to remove acid species from a gas stream. The sorbent compositions may be used at coal-fired power plants (e.g., bituminous coal-fired, or lignite-fired power stations), natural gas refineries, precious metal mines, waste incineration plants (e.g., domestic waste, hazardous waste, or sewage sludge incineration plants), other plants for high-temperature processes (e.g., cement burning), and high-temperature plants co-fired with waste or combined (multistage) high-temperature plants (e.g., power stations or cement rotary kilns having an upstream waste pyrolysis or waste gasification). The sorbent compositions may be introduced into a gas stream derived from a heat generating system selected from the group consisting of a combustion system, a power plant combustion system, a coal combustion system, a waste incineration system, a kiln, a kiln for mining operations, a recovery boiler, a coal gasification process stream, a gas production stream, a biomass combustion system, and an ore processing system.

The sorbent compositions may be used in processes of any dimension. The methods can be used in processes having a flue gas volumetric flow rate of $15 \times 10^3$ m$^3$ S.T.P. db/h, for example for sewage sludge incineration, or of $50 \times 10^3$ m$^3$ S.T.P. db/h, for example in hazardous waste incineration plants, or of $150 \times 10^3$ m$^3$ S.T.P. db/h, for example in domestic waste incineration, and also in large power stations having, for example, $2$-$3 \times 10^6$ m$^3$ S.T.P. db/h.

In certain embodiments, a process of treating a gas stream containing hydrogen halides and sulfur oxides includes applying a sorbent composition disclosed herein into said gas stream ahead of a particulate matter collection device, in order to adsorb at least a portion of the hydrogen halide and sulfur oxide containing compound. The particulate matter collection device may be one or more of the following devices: electrostatic precipitation (ESP), filtration, inertial separation, baghouse, cyclone, spray dry absorber (SDA), wet fluegas desulfurizer (wFGD), or any combination thereof. In certain embodiments, there are a plurality of particulate collection devices; optionally wherein one of said particulate collection devices are positioned subsequent to another particulate collection device.

In certain embodiments, the sorbent composition may be applied to the gas stream by housing the sorbent in a fixed bed apparatus through which the gas stream is made to pass. In another embodiment, the sorbent composition may be contained within a fiber bag used in a filter baghouse. In another embodiment, the sorbent composition may be applied to the gas stream through various methods known in the art, for example, through a lance, an additional medium such as a fuel source (e.g., coal), a conveyor belt, or one or more ports in communication with a combustion system (e.g., asymmetrically placed ports). The sorbent composition may be exposed to a gas stream by applying said sorbent into the gas stream with a carrier gas; optionally wherein said carrier gas is air or nitrogen; optionally wherein said carrier gas is applied upstream of a particulate control device; and optionally wherein said particulate matter collection device contains at least one of the following devices: ESP, baghouse, or cyclone.

The temperature of the gas stream into which the sorbent composition is applied may be between 200° F. and 900° F. The gas stream may contain at least one of the following halogens: chloride, bromide, iodide, and salts thereof. The gas stream may contain sulfur dioxide and sulfur trioxide. The gas stream may contain mercury.

In one exemplary embodiment, a sorbent composition is injected into the flue gas of a coal fired power plant at a location upstream of an air preheater and a particulate control device. To carry out the injection, the sorbent is fed from a feeding silo and pneumatically carried through injection lances positioned within the flue gas duct work thereby affording a fine dispersion of the material within the flue gas, covering the entire cross-sectional area of the duct. Sorbent composition feed rates are determined gravimetrically and set in the range of 1 to 15 kilograms per cubic meter of flue gas according to the desired reduction targets for hydrogen chloride and sulfur oxide. The capture of hydrogen chloride from the flue gas by the sorbent composition is verified by measurements of flue gas hydrogen chloride concentrations made by infrared spectrometers (e.g., FTIR and/or NDIR) and wet-chemical sampling methods (e.g., EPA Method 26A).

In another exemplary embodiment, a sorbent composition is injected into the flue gas of a coal fired power plant at a location between an air preheater and a particulate control device. To carry out the injection, the sorbent is fed from a feeding silo and pneumatically carried through injection lances positioned within the flue gas duct work thereby affording a fine dispersion of the material within the flue gas, covering the entire cross-sectional area of the duct. Sorbent composition feed rates are determined gravimetrically and set in the range of 1 to 15 kilograms per cubic meter of flue gas according to the desired reduction targets for hydrogen chloride and sulfur oxide. The capture of hydrogen chloride from the flue gas by the sorbent composition is verified by measurements of flue gas hydrogen chloride concentrations made by infrared spectrometers (e.g., FTIR and/or NDIR) and wet-chemical sampling methods (e.g., EPA Method 26A).

In certain embodiments, a method further comprises monitoring sulfur oxide and hydrogen chloride emissions and responding with the addition of sorbent composition in accordance with the acid gas levels in said system.

In certain embodiments, the sorbent composition may be applied to the gas stream with one or more additional components. The sorbent compositions may applied as a powder blended with mercury sorbents such as but not limited to activated carbon, halogenated activated carbon (e.g., chlorinated activated carbon or brominated activated carbon), and inorganic mercury sorbents. Alternatively, the mercury sorbent may be applied upstream of the sorbent composition. The mercury sorbent may be added separately from the sorbent composition by such methods as DSI (Duct Sorbent Injection).

In certain embodiments, the sorbent composition may be applied to the gas stream with an oxidizing agent. The oxidizing agent may be combined with the sorbent composition prior to treatment of a flue gas. In certain embodiments, the oxidizing agent may be applied to the gas stream prior to, after, and/or at the same time of application of the sorbent composition to the flue gas. The oxidizing agent may be conveyed into the gas stream through one or more mediums. In certain embodiments, the medium is coal and said gas stream derives from at least a coal combustion system. The oxidizing agent may be selected from the group consisting of: a thermolabile molecular halogen, calcium bromide, and halogen-containing compounds such as but not limited to hydrogen bromide, hydrogen chloride, ammonium bromide, ammonium chloride, sodium chloride, sodium bromide, calcium chloride or combinations thereof.

In certain embodiments, the sorbent composition is capable of being traced in a gas stream. The sorbent composition may contain one or more moieties or contain one or more functional groups capable of being quantitated by one or more analytical techniques or quantitation protocols. In certain embodiments, the moieties may be magnetic. For example, the magnetic moieties may be incorporated into the silica-containing particles as described in this disclosure and equivalents thereof. One of ordinary skill in the art would be able to incorporate the moieties, e.g. magnetic moieties into the particle, e.g. silica-containing particle. In another embodiment, the moieties are metallic. For example, metallic moieties may be incorporated into the silica-containing particles as described in this disclosure and equivalents thereof. In another embodiment, the sorbent composition may be monitored by fluorescence and/or absorbance measurements. In another embodiment, the sorbent composition may be monitored by magnetic and/or metal detectors.

5. EXAMPLES

The foregoing may be better understood by reference to the following examples, which are presented for purposes of illustration and are not intended to limit the scope of the invention.

Example 1

In this example, 500 ml of sodium silicate solution, which was diluted with DI water to approximately 8 wt % silica, was desalted by running through an ion exchange column filled with 250 ml of acidic Dowex 650C resin. The solution coming out from the column was collected at a pH value between 3 and 3.5, containing 7.6 wt % of solid. 39.83 g of the silica solution was sprayed onto 56.0 g of CaO with a spray bottle while stirring in a round bottom flask to yield a final dry-flowing powder (Sample 1) with a theoretical formula of $(SiO_2)_{0.05}(OH)_y \cdot Ca(OH)_2$. The theoretical formula was calculated by initial mass of each component. For instance, the silica precursor solution contained 3.03 g of silica (0.05 moles). The CaO (56.0 g) produced 74.1 g of $Ca(OH)_2$ (1 mole). Given that no loss was observed during the hydration, the theoretical formula of final powder product was $(SiO_2)(OH)_y \cdot 19.8\ Ca(OH)_2$.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 26.4 square meters per gram, a pore volume of 0.12 cc/g, and a pore diameter of 17.5 nm. TGA analysis of the powder indicated 15.8 wt % mass loss due to moisture.

Example 2

In this example, 500 ml of sodium silicate solution, which was diluted with DI water to approximately 8 wt % silica, was desalted by running through an ion exchange column filled with 250 ml of acidic Dowex 650C resin. The solution coming out from the column was collected at a pH value between 3 and 3.5, containing 7.6 wt % of solid. 49.03 g of the silica solution was sprayed onto 56.0 g of CaO with a spray bottle while stirring in a round bottom flask to yield a final dry-flowing powder (Sample 2) with a theoretical formula of $(SiO_2)(OH)_y \cdot 16.1\ Ca(OH)_2$.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 24.2 square meters per gram, a pore volume of 0.10 cc/g, and a pore diameter of 16.5 nm. TGA analysis of the powder indicated 18.3 wt % mass loss due to moisture.

Example 3

In this example, 500 ml of sodium silicate solution, which was diluted with DI water to approximately 8 wt % silica, was desalted by running through an ion exchange column filled with 250 ml of acidic Dowex 650C resin. The solution coming out from the column was collected at a pH value between 3 and 3.5, containing 7.6 wt % of solid. 31.69 g of the silica solution was sprayed onto 56.0 g of CaO with a spray bottle while stirring in a round bottom flask to yield a final dry-flowing powder (Sample 3) with a theoretical formula of $(SiO_2)(OH)_y \cdot 24.9\ Ca(OH)_2$.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 18.7 square meters per gram, a pore volume of 0.11 cc/g, and a pore diameter of 16.5 nm. TGA analysis of the powder indicated 8.7 wt % mass loss due to moisture.

Example 4

In this example, a colloidal silica sol, Nalco 1034A, was diluted with DI water to obtain a silica solution containing 7 wt % silica particles 20 nm in diameter. 39.33 g of the solution was sprayed onto 56.0 g of CaO with a spray bottle while stirring in a round bottom flask to yield a final dry-flowing powder (Sample 4) with a theoretical formula of $(SiO_2)(OH)_y \cdot 21.8\ Ca(OH)_2$. Nalco 1034A can be purchased from Nalco Company, 1601 W. Diehl Road, Naperville, Ill., 60563.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 20.3 square meters per gram, a pore volume of 0.06 cc/g, and a pore diameter of 11.9 nm. TGA analysis of the powder indicated 5 wt % mass loss due to moisture.

Example 5

In this example, a 30% sodium silicate solution was diluted with DI water to obtain a 3 wt % silica solution. 2.268 kg of the dilute solution was sprayed onto 3.5 kg of CaO while stirring the powder in a plow mixer (Littleford Day model M-DVT22) to yield a final dry-flowing powder (Sample 5) with a theoretical formula of $(SiO_2)(OH)_y \cdot 55.1 Ca(OH)_2$.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 33.4 square meters per gram, a pore volume of 0.14 cc/g, and a pore diameter of 16.6 nm.

Example 6

In this example, a colloidal silica solution (Nalco 1142; 40 wt % silica) was diluted with DI water to obtain a silica solution containing 3 wt % silica. 2.250 kg of the dilute solution was sprayed onto 3.5 kg of CaO while stifling the powder in a plow mixer (Littleford Day mixer model M-DVT22) to yield a final dry-flowing powder (Sample 6) with a theoretical formula of $(SiO_2)(OH)_y \cdot 55.6\ Ca(OH)_2$. Nalco 1142 can be purchased from Nalco Company, 1601 W. Diehl Road, Naperville, Ill., 60563.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 44.2 square meters per gram, a pore volume of 0.25 cc/g, and a pore diameter of 22.2 nm.

Example 7

In this example, 3 L of sodium silicate solution, which was diluted with DI water to approximately 8 wt % silica, was desalted by running through an ion exchange column filled with 1.5 L of acidic Dowex 650C resin. The solution coming out from the column was collected at a pH value between 3 and 3.5, containing 7.6 wt % of silica. This silicic acid solution was further diluted with DI water to prepare a 3 wt % solution. 2.250 kg of silicic acid was sprayed onto 3.5 kg of CaO while stirring the powder in a plow mixer (Littleford Day mixer model M-DVT22) to yield a final dry-flowing powder (Sample 7) with a theoretical formula of $(SiO_2)(OH)_y \cdot 55.6 Ca(OH)_2$. Nalco 1142 can be purchased from Nalco Company, 1601 W. Diehl Road, Naperville, Ill., 60563.

Nitrogen sorption analysis of the powder was performed on an Autosorb-1C unit from Quantachrome. The sample was degassed at 180° C. for 5 h, and then characterized by a multi-point BET surface area, total pore volume, and BJH adsorption pore size distribution. Nitrogen sorption analysis indicated a surface area of 42.1 square meters per gram, a pore volume of 0.16 cc/g, and a pore diameter of 11.6 nm.

Example 8

The acid gas removal efficiency of a silica containing basic sorbent with a formula of $(SiO_2)(OH)_y \cdot 19.8\ Ca(OH)_2$, hydrated by a 7.6 wt % silicic acid solution (Sample 1), was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The mass increase of substrate resulted from HCl capture was used to calculate the HCl capture efficiency and uptake rate. The capture efficiency is defined as the product conversion when reacting with HCl at 80 minutes. The HCl uptake rate is estimated by the initial slope of the mass change curve between 0 to 20 minutes and is representative of the reaction kinetics. The uptake experiment showed 15.9% of capture efficiency and $0.18\%/min^{-1}$ of uptake rate compared to 12.8% efficiency of conventional hydrated lime.

Example 9

The acid gas removal efficiency of a silica containing basic sorbent with formula of $(SiO_2)(OH)_y \cdot 55.1\ Ca(OH)_2$, hydrated by 3 wt % sodium silicate (Sample 5), was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The uptake experiment showed 28.4% of capture efficiency and $0.24\%/min^{-1}$ of uptake rate compared to 12.8% efficiency of conventional hydrated lime.

Example 10

The acid gas removal efficiency of a silica containing basic sorbent with formula of $(SiO_2)(OH)_y \cdot 55.6\ Ca(OH)_2$, hydrated by 3 wt % Nalco 1142 (Sample 6), was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The uptake experiment showed 34.0% of capture efficiency and 0.26%/min$^{-1}$ of uptake rate compared to 12.8% efficiency of conventional hydrated lime.

Example 11

The acid gas removal efficiency of a silica containing basic sorbent with formula of $(SiO_2)(OH)_y \cdot 55.6\ Ca(OH)_2$, hydrated by 3 wt % silicic acid solution (Sample 7), was evaluated using a NETZSCH TGA/DTA analyzer (model: STA 449 F3 Jupiter). 5 g of sorbent was evenly placed in an alumina plate that was subjected to an atmosphere of 750 ppm $HCl_{(g)}$ at 200° C. The uptake experiment showed 37.0% of capture efficiency and 0.52%/min$^{-1}$ of uptake rate comparing to 12.8% efficiency of conventional hydrated lime.

Example 12

The performance of sorbents was investigated in the combustion test facility (CTF) at Western Research Institute. The facility fires a PRB coal with HCl gas injected prior to an air preheater and a particulate control device to provide a flue gas stream containing hydrogen chloride and sulfur oxide gases. The sorbent was injected into the duct path between the air preheater and the particulate control device. To carry out the injection, the sorbent is fed as a free-flowing powder from a feeding silo and pneumatically carried through injection lances positioned within the flue gas duct work thereby affording a fine dispersion of the material within the flue gas, covering the entire cross-sectional area of the duct. Sorbent feed rates are determined gravimetrically and set in the range of 1 to 15 kilograms per cubic meter of flue gas according to the desired reduction targets for hydrogen chloride and sulfur oxide. The capture of hydrogen chloride and sulfur oxide from the flue gas by the sorbent is verified by measurements of flue gas pollutant concentrations made by infrared spectrometers (e.g., FTIR and/or NDIR) and wet-chemical sampling methods (e.g., EPA Method 26A).

Figure 2:
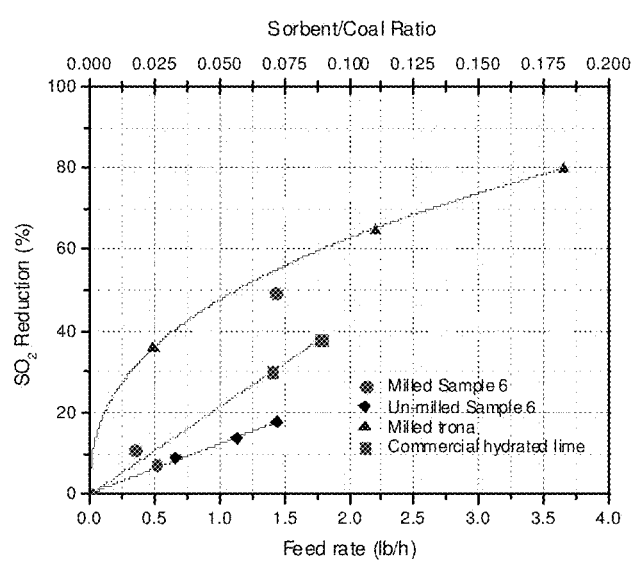
FIG. 2 depicts the $SO_2$ reduction in the flue gas stream by various sorbents tested in a combustion test facility at Western Research Institute.

FIGS. 1 and 2 represents simultaneous HCl and $SO_2$ reduction in the flue gas by one of the synthetic sorbents (Sample 6), and performance comparison to conventional sorbents (trona and hydrated lime). Sample 6 was milled to form small particulates with a particle size distribution similar to milled trona to enhance the reactivity and allow for a more accurate comparison. The result clearly showed that the un-milled sample 6 is as good as trona in terms of HCl capture and significantly better than hydrated lime. Moreover, un-milled sample 6 preferentially reacts with HCl rather than $SO_2$ when compared to trona. Although the selectivity of HCl vs. $SO_2$ slightly decreases, the milled synthetic sorbent exhibits superior HCl reactivity than all conventional sorbents tested in the trial.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A process of treating a gas stream containing acidic pollutants, including sulfur oxides and/or hydrogen halides, the process comprising applying a sorbent composition into said gas stream ahead of a particulate matter collection device, in order to adsorb at least a portion of the acid pollutant species, wherein said sorbent composition comprises a compound having formula (II), $$(SiO_2)_x(OH)_y \cdot B \qquad (II)$$

wherein

B is a hygroscopic solid at a preferred water to solid molar ratio of about 0.1 to about 6, wherein B is a basic metal oxide, hydroxide or carbonate, said B containing at least one metal cation selected from calcium, magnesium, strontium, barium, sodium, lithium, potassium, cesium, lanthanum, cerium, praseodymium, neodymium, samarium, europium, gadolinium, dysprosium, scandium, ytterbium, yttrium, and erbium; and the molar ratio of y/x is equal to 0.01-0.5.

2. The process of claim 1, wherein said particulate matter collection device is one or more of the following devices: electrostatic precipitation (ESP), filtration, inertial separation, fabric filter, baghouse, cyclone, spray drier absorber, or wet flue gas desulfurizer.

3. The process of claim 1, wherein said gas stream derives from a heat generating system and wherein said heat generating system is at least one of the following: a combustion system; a power plant combustion system; a coal combustion system; a waste incineration system; a kiln; a kiln for mining operations; a recovery boiler; a coal gasification process stream; a gas production stream; biomass combustion system; or an ore processing system.

4. The process of claim 1 in which the sorbent composition is exposed to the gas stream by applying said sorbent into the gas stream with a carrier gas; optionally wherein said carrier gas is as air or nitrogen; optionally wherein said carrier gas is applied upstream of the particulate control device; and optionally wherein said particulate matter collection device contains at least one of the following devices: ESP, baghouse, cyclone, spray drier absorber, or wet flue gas desulfurizer.

5. The process of claim 1 in which the sorbent composition is applied to the gas stream by application as a dry blend with mercury sorbents and optionally upstream of the sorbent; wherein said mercury sorbent includes but is not limited to activated carbon, halogenated activated carbon, or an inorganic mercury sorbent.

6. The process of claim 1 in which the sorbent composition is applied to the gas stream wherein the temperature of the gas stream is between about 200° F. and about 900° F.

7. The process of claim 1 in which the sorbent is applied to the gas stream by housing the sorbent in a fixed bed apparatus through which the gas stream is made to pass.

8. The process of claim 1 in which the sorbent composition is applied to the gas stream by entraining the sorbent with the gas stream in a fluidized bed device.

9. The process of claim 1, wherein the sorbent composition further comprises 1-50% trona or sodium bicarbonate.

10. The process of claim 1, wherein the sorbent composition further comprises 1-50% activated carbon.

11. The process of claim 10 where the activated carbon is replaced with or mixed with halogenated activated carbon.

12. The process of claim 10 wherein the activated carbon is prepared from carbon based starting materials such as but not limited to coal, lignite, wood, wood byproducts, or bark.

13. The process of claim 1 further comprising: applying an oxidizing agent to the flue gas.

14. The process of claim 13, wherein said oxidizing agent is applied prior to said sorbent.

15. The process of claim 13, wherein said oxidizing agent is at least one of the following: a thermolabile molecular halogen, calcium bromide, or a halogen-containing compound.

16. The process of claim 13, wherein said oxidizing agent is combined with said sorbent composition prior to said treatment of said flue gas.

17. The process of claim 13, wherein oxidizing agent is applied to the gas stream at least at one of the following time points: prior to, after, or at the same time of said application of said sorbent composition to the flue gas.

18. The process of claim 13 wherein said oxidizing agent is conveyed into the gas stream through one or more mediums.

19. The process of claim 18, wherein said medium is coal and said gas stream derives from at least a coal combustion system.

20. The process of claim 1, wherein there are a plurality of particulate collection devices; optionally wherein one of said particulate collection devices are positioned subsequent to another particulate collection device.

21. The process of claim 1 wherein a mercury sorbent is added separately from the sorbent composition.

22. The process of claim 1 wherein the sorbent composition is combined with other inorganic mercury sorbents such as but not limited to natural or synthetic aluminosilicates, zeolites, or silica-based materials.

23. The process of claim of claim 1, wherein the gas stream contains at least one of the following halogens: chloride, bromide, or iodide, or a salt thereof.

24. The process of claim 1, wherein said sorbent composition is capable of being traced in said gas stream.

25. The process of claim 1, wherein said sorbent composition contains one or more moieties or contains one or more functional groups capable of being quantitated by one or more analytical techniques or quantitation protocols.

26. The process of claim 25, wherein the moieties are magnetic.

27. The process of claim 1, wherein said sorbent composition is monitored by fluorescence, absorbance, and/or magnetic measurements.

28. The process of claim 1, further comprising monitoring sulfur oxides and hydrogen halide emissions systems and responding with the addition of said sorbent composition in accordance with the hydrogen halide and/or sulfur oxides in said system.

* * * * *

UNITED STATES PATENT AND TRADEMARK OFFICE
CERTIFICATE OF CORRECTION

PATENT NO. : 9,227,172 B2  Page 1 of 1
APPLICATION NO. : 13/646514
DATED : January 5, 2016
INVENTOR(S) : Ian Saratovsky et al.

It is certified that error appears in the above-identified patent and that said Letters Patent is hereby corrected as shown below:

Claims in col. 14, l. 46, claim 4, change "gas is as air" to --gas is air-- in col. 16, l. 1, claim 20, change "devices are positioned" to --devices is positioned--

Signed and Sealed this
Nineteenth Day of April, 2016

Michelle K. Lee
*Director of the United States Patent and Trademark Office*